United States Patent
Fisher et al.

(10) Patent No.: US 10,336,470 B2
(45) Date of Patent: Jul. 2, 2019

(54) POD LAUNCH AND LANDING SYSTEM FOR VERTICAL TAKE-OFF AND LANDING (VTOL)UNMANNED AERIAL VEHICLES (UAVS)

(71) Applicant: AeroVironment, Inc., Simi Valley, CA (US)

(72) Inventors: Christopher Eugene Fisher, Leo, IN (US); Jason Sidharthadev Mukherjee, Simi Valley, CA (US); William Arden Lott, Simi Valley, CA (US)

(73) Assignee: AEROVIRONMENT, INC., Simi Valley, CA (US)

( * ) Notice: Subject to any disclaimer, the term of this patent is extended or adjusted under 35 U.S.C. 154(b) by 0 days.

(21) Appl. No.: 15/042,053

(22) Filed: Feb. 11, 2016

(65) Prior Publication Data
US 2017/0144776 A1   May 25, 2017

Related U.S. Application Data

(60) Provisional application No. 62/115,080, filed on Feb. 11, 2015.

(51) Int. Cl.
*B64F 1/22* (2006.01)
*B64C 39/02* (2006.01)
(Continued)

(52) U.S. Cl.
CPC .............. *B64F 1/222* (2013.01); *B64C 29/02* (2013.01); *B64C 39/024* (2013.01); *B64F 1/005* (2013.01);
(Continued)

(58) Field of Classification Search
CPC .... B64F 1/222; B64F 1/04; B64F 1/24; B64F 3/00; B64C 39/024; B64C 29/02;
(Continued)

(56) References Cited

U.S. PATENT DOCUMENTS

| 2,151,128 A | 3/1939 | Looney |
| 2,961,189 A | 11/1960 | Doak |

(Continued)

FOREIGN PATENT DOCUMENTS

| JP | 2012198883 A | 10/2012 |
| WO | 2006022654 A1 | 3/2006 |

(Continued)

OTHER PUBLICATIONS

European Search Report for EP Application No. 14828680.0 dated Nov. 10, 2016.
(Continued)

*Primary Examiner* — Richard R. Green
*Assistant Examiner* — Vicente Rodriguez
(74) *Attorney, Agent, or Firm* — Brooks Acordia IP Law, PC; Michael Zarrabian; Eric Aagaard

(57) ABSTRACT

An unmanned aerial vehicle (UAV) storage and launch system, including: a UAV pod having an interior; and a telescoping UAV landing surface disposed in the interior of the UAV pod; where the telescoping UAV landing surface may translate up toward a top opening of the UAV pod, translate down into an interior of the UAV pod, or rotate relative to the UAV pod.

19 Claims, 10 Drawing Sheets

(51) Int. Cl.
  *B64F 1/00* (2006.01)
  *B64F 1/02* (2006.01)
  *B64C 29/02* (2006.01)
  *B64F 1/04* (2006.01)
  *B64F 1/24* (2006.01)

(52) U.S. Cl.
  CPC ............... *B64F 1/02* (2013.01); *B64F 1/04* (2013.01); *B64F 1/24* (2013.01); *B64C 2201/021* (2013.01); *B64C 2201/088* (2013.01); *B64C 2201/182* (2013.01); *B64C 2201/201* (2013.01)

(58) Field of Classification Search
  CPC ... B64C 2201/201; B64C 29/18; B64C 29/20; B64C 29/088; B64C 29/08; B64C 2201/18; B60L 11/1824
  See application file for complete search history.

(56) References Cited

U.S. PATENT DOCUMENTS

| | | | |
|---|---|---|---|
| 3,181,810 A | 5/1965 | Olson | |
| 3,527,431 A | 9/1970 | Wright | |
| 4,116,408 A | 9/1978 | Soloy | |
| 4,410,151 A | 10/1983 | Hoeppner et al. | |
| 4,700,653 A | 10/1987 | Harris et al. | |
| 4,814,711 A | 3/1989 | Olsen et al. | |
| 5,062,587 A | 11/1991 | Wernicke | |
| 5,289,994 A | 3/1994 | Del Campo Aguilera | |
| 5,311,436 A | 5/1994 | Trennel | |
| 5,419,514 A | 5/1995 | Ducan | |
| 5,577,687 A | 11/1996 | Downing | |
| 5,765,783 A | 6/1998 | Albion | |
| 5,950,372 A | 9/1999 | Al-Sabah et al. | |
| 6,056,237 A | 5/2000 | Woodland | |
| 6,079,668 A | 6/2000 | Brown | |
| 6,229,299 B1 | 5/2001 | Strashny | |
| 6,371,410 B1 | 4/2002 | Cairo-Iocco et al. | |
| 7,299,925 B1 | 11/2007 | Ansay et al. | |
| 7,472,863 B2 | 1/2009 | Pak | |
| 7,766,274 B1 | 8/2010 | Jameson et al. | |
| 8,146,855 B2 | 4/2012 | Ismailov | |
| 8,297,552 B2 | 10/2012 | Ying | |
| 8,439,301 B1 | 5/2013 | Lussier et al. | |
| 8,453,962 B2 | 6/2013 | Shaw | |
| 8,511,606 B1* | 8/2013 | Lutke .................. B64C 39/028 244/100 R |
| 8,590,828 B2 | 11/2013 | Marcus | |
| 8,602,348 B2 | 12/2013 | Bryant | |
| 8,616,492 B2 | 12/2013 | Oliver | |
| 8,695,916 B2 | 4/2014 | Martin et al. | |
| 8,733,690 B2 | 5/2014 | Bevirt et al. | |
| 8,800,912 B2 | 8/2014 | Oliver | |
| 8,979,032 B1 | 3/2015 | Hester et al. | |
| 9,056,676 B1 | 6/2015 | Wang | |
| 9,102,401 B2 | 8/2015 | Collins et al. | |
| 9,139,310 B1 | 9/2015 | Wang | |
| 9,164,506 B1 | 10/2015 | Zang | |
| 9,302,783 B2 | 4/2016 | Wang | |
| 9,382,003 B2 | 7/2016 | Burema et al. | |
| 9,387,928 B1 | 7/2016 | Gentry et al. | |
| 9,429,945 B2 | 8/2016 | Pulleti et al. | |
| 9,527,605 B1 | 12/2016 | Gentry et al. | |
| 9,561,871 B2 | 2/2017 | Sugumaran | |
| 9,623,760 B2 | 4/2017 | Wang et al. | |
| 9,880,563 B2 | 1/2018 | Fisher et al. | |
| 9,977,435 B2 | 5/2018 | Fisher et al. | |
| 10,124,912 B2 | 11/2018 | Walsh et al. | |
| 2005/0006525 A1 | 1/2005 | Byers et al. | |
| 2005/0066806 A1 | 3/2005 | Helms et al. | |
| 2005/0178879 A1 | 8/2005 | Mao | |
| 2005/0231157 A1 | 10/2005 | Sanders et al. | |
| 2006/0249622 A1 | 11/2006 | Steele | |
| 2006/0249623 A1 | 11/2006 | Steele | |
| 2006/0261207 A1 | 11/2006 | Woodruff et al. | |
| 2009/0236470 A1* | 9/2009 | Goossen .............. B64C 39/024 244/115 |
| 2009/0294573 A1 | 12/2009 | Wilson et al. | |
| 2010/0131121 A1 | 5/2010 | Gerlock | |
| 2010/0157055 A1 | 6/2010 | Pechatnikov | |
| 2010/0168949 A1 | 7/2010 | Malecki et al. | |
| 2010/0252690 A1 | 10/2010 | Hothi et al. | |
| 2011/0042509 A1 | 2/2011 | Bevirt et al. | |
| 2011/0168838 A1 | 7/2011 | Hornback et al. | |
| 2011/0174925 A1 | 7/2011 | Ying | |
| 2011/0180673 A1 | 7/2011 | Lim | |
| 2011/0264314 A1 | 10/2011 | Parras | |
| 2011/0303795 A1 | 12/2011 | Oliver | |
| 2012/0001020 A1 | 1/2012 | Miralles et al. | |
| 2012/0043413 A1 | 2/2012 | Smith | |
| 2012/0050090 A1 | 3/2012 | Rudnisky et al. | |
| 2012/0080556 A1 | 4/2012 | Root | |
| 2012/0091257 A1* | 4/2012 | Wolff .................. B64C 29/0033 244/12.4 |
| 2012/0210853 A1 | 8/2012 | Abershitz et al. | |
| 2012/0215382 A1 | 8/2012 | Lee et al. | |
| 2012/0248259 A1 | 10/2012 | Page et al. | |
| 2012/0271491 A1 | 10/2012 | Spata | |
| 2012/0318915 A1 | 12/2012 | Gatzke | |
| 2013/0161447 A1* | 6/2013 | McGeer .............. B64C 39/024 244/110 F |
| 2013/0176423 A1 | 7/2013 | Rischmuller et al. | |
| 2013/0318214 A1 | 11/2013 | Tebay et al. | |
| 2014/0032034 A1 | 1/2014 | Raptopoulos et al. | |
| 2014/0124621 A1 | 5/2014 | Godzdanker et al. | |
| 2014/0126838 A1 | 5/2014 | Schultz et al. | |
| 2014/0277834 A1 | 9/2014 | Levien et al. | |
| 2014/0316616 A1 | 10/2014 | Kugelmass | |
| 2015/0136897 A1 | 5/2015 | Seibel et al. | |
| 2015/0158598 A1 | 6/2015 | You | |
| 2015/0321758 A1 | 11/2015 | Peter | |
| 2015/0336669 A1 | 11/2015 | Kantor et al. | |
| 2015/0353206 A1 | 12/2015 | Wang | |
| 2016/0009413 A1* | 1/2016 | Lee ....................... B64F 1/007 701/16 |
| 2016/0011592 A1 | 1/2016 | Zhang et al. | |
| 2016/0039542 A1 | 2/2016 | Wang | |
| 2016/0068265 A1 | 3/2016 | Hoareau et al. | |
| 2016/0117931 A1 | 4/2016 | Chan et al. | |
| 2016/0137311 A1 | 5/2016 | Peverill et al. | |
| 2016/0144734 A1 | 5/2016 | Wang et al. | |
| 2016/0185466 A1 | 6/2016 | Dreano | |
| 2016/0196756 A1 | 7/2016 | Prakash et al. | |
| 2016/0229299 A1* | 8/2016 | Streett ................. B64C 39/024 |
| 2016/0247404 A1 | 8/2016 | Srivastava et al. | |
| 2016/0253808 A1 | 9/2016 | Metzler et al. | |
| 2016/0257401 A1 | 9/2016 | Buchmueller et al. | |
| 2016/0376031 A1 | 12/2016 | Michalski et al. | |
| 2017/0027155 A1 | 2/2017 | Ehrlich et al. | |
| 2017/0083979 A1 | 3/2017 | Winn et al. | |
| 2017/0101017 A1 | 4/2017 | Streett | |
| 2017/0158353 A1 | 6/2017 | Schmick | |
| 2017/0160740 A1 | 6/2017 | Srivastava et al. | |
| 2017/0161968 A1 | 6/2017 | Xie et al. | |
| 2017/0177006 A1 | 6/2017 | Fisher et al. | |
| 2017/0186329 A1 | 6/2017 | Gao et al. | |
| 2017/0190260 A1 | 7/2017 | Wang et al. | |
| 2017/0203857 A1 | 7/2017 | O'Toole | |
| 2017/0225802 A1 | 8/2017 | Lussier et al. | |
| 2017/0227965 A1 | 8/2017 | DeCenzo et al. | |
| 2017/0259917 A1 | 9/2017 | Winn et al. | |

FOREIGN PATENT DOCUMENTS

| | | |
|---|---|---|
| WO | 2009066073 A1 | 5/2009 |
| WO | 2011159281 A1 | 12/2011 |
| WO | 2015012935 A2 | 1/2015 |

OTHER PUBLICATIONS

First Office Action for CN Application No. 201480033924X dated Nov. 15, 2016.

(56) References Cited

OTHER PUBLICATIONS

Intellectual Property Office of Singapore Written Opinion for Application No. 11201508858P dated Sep. 5, 2016.
International Search Report and Written Opinion for PCT/US16/17407 dated Jul. 27, 2016.
International Search Report for PCT/US14/36863 dated Mar. 20, 2015.
Oosedo, Konno, Matumoto, Go, Masuko, Abiko, and Uchiyama, "Design and Simulation of a Quad Rotor Tail-Sitter Unmanned Aerial Vehicle," Tohoku University, IEEE, 2010, 978-1-4244-9315-9/10.
Non-Final Office action for U.S. Appl. No. 14/270,320 dated Feb. 25, 2016.
International Search Report and Written Opinion for serial No. PCT/US16/17400, dated May 12, 2016.
International Search Report for PCT/US16/17417 dated Jul. 27, 2016.
International Search Report for PCT/US16/17540 dated May 23, 2016.
International Search Report for PCT/US16/17614 dated May 19, 2016.

* cited by examiner

POD LAUNCH AND LANDING SYSTEM FOR VERTICAL TAKE-OFF AND LANDING (VTOL) UNMANNED AERIAL VEHICLES (UAVS)

CROSS-REFERENCE TO RELATED APPLICATIONS

This application claims priority to and the benefit of U.S. Provisional Patent Application No. 62/115,080, filed Feb. 11, 2015, the contents of which are hereby incorporated by reference herein for all purposes.

BACKGROUND

Technical Field

The field of the invention relates to unmanned aerial vehicle (UAV) systems, and more particularly to systems for operating a UAV autonomously.

Description of the Related Art

Aerial geographic survey work for the agricultural and oil industries incur the logistics and costs of personnel to operate and maintain the air vehicle as well as collect and process the associated data. These costs are typically compounded by need for a substantial amount of this work to be performed at, or relatively near to, the location of the survey, which typically is well removed from any population centers. As a result, it is advantageous to increase automation, reliability (reduce complexity), range, and capability of an air vehicle and support system for performing such data retrieval and processing tasks.

SUMMARY

An unmanned aerial vehicle (UAV) storage and launch system includes a UAV pod having an interior and a telescoping UAV landing surface disposed in the interior of the UAV pod so that the telescoping UAV landing surface may translate up toward a top opening of the UAV pod, translate down into an interior of the UAV pod, or rotate relative to the UAV pod. The telescoping UAV landing surface may also include one or more guides for aligning a wing of a UAV, and the one or more guides may include a rigid alignment tab that extends upward from the telescoping UAV landing surface. The one or more guides may include opposing guides that taper together towards their bases to form a generally scalloped surface. In such embodiments the generally scalloped surface of the opposing guides may rotatably guide the wing of the UAV into a predetermined angular orientation relative to the telescoping UAV landing surface. In other embodiments, the one or more guides are at least one of: rails, posts, and paddles. Alternatively, the one or more guides may include guide paddles, wherein each pair of guide paddles forms a V-channel that guide the wing of the UAV into a proper angular orientation relative to the UAV pod to enable translation of the UAV into the UAV pod. In further embodiments, the one or more guides may include guide posts, wherein the guide posts are spaced apart to allow the wing of the UAV to be seated between the guide posts. The telescoping UAV landing surface may be rotated relative to the UAV pod to account for crosswind during a launch of a UAV seated in the UAV landing surface. The telescoping UAV landing surface may be rotatable relative to the UAV pod to align a wing of a UAV seated on the UAV landing surface subsequent to a landing of the UAV. The telescoping UAV landing surface may also be rotated relative to the UAV pod to a predetermined alignment with the UAV pod.

A method includes transitioning a unmanned aerial vehicle (UAV) pod from a closed position to an open position, wherein a vertical takeoff and landing (VTOL) UAV enclosed in the UAV pod is protected from the elements in the closed position, translating a UAV landing surface up to a top opening of the UAV pod in the open position, and launching a VTOL UAV from the UAV landing surface. The method may also include translating, subsequent to launching the VTOL UAV, the UAV landing surface to an interior of the UAV pod and transitioning the UAV pod from the open position to the closed position. The method may also include transitioning the UAV pod from the closed position to the open position, translating the UAV landing surface up to the top opening of the UAV pod, and landing the VTOL UAV on the landing surface. Additionally, the method may include rotating the UAV landing surface relative to the UAV pod such that a wing of the VTOL UAV does not impinge on any side walls of the UAV pod as the UAV is translated to an interior of the UAV pod, translating the UAV landing surface to the interior of the UAV pod, and transitioning the UAV pod from the open position to the closed position. In embodiments, the method may include rotating, prior to launching the VTOL UAV, the UAV landing surface relative to the UAV pod to account for crosswind, and the rotating the UAV landing surface step may include generating, by at least one motor of the VTOL UAV, a reverse thrust to create an asymmetric force to rotate the UAV landing surface. The method steps may also include landing the VTOL UAV on the landing surface, translating the UAV landing surface to an interior of the UAV pod, and transitioning the UAV pod from the open position to the closed position. It may also include rotating, prior to translating the UAV landing surface, the UAV landing surface relative to the UAV pod such that the wings of the UAV do not impinge on any side walls of the UAV pod. The rotation of the UAV landing surface relative to the UAV may also include generating, by at least one motor of the VTOL UAV, a reverse thrust to create an asymmetric force to rotate the UAV landing surface.

An unmanned aerial vehicle (UAV) storage and launch system may include a UAV pod, wherein the UAV pod may transition from a closed position to an open position, and a rotatable UAV landing surface disposed inside the UAV pod in the closed position so that the rotatable UAV landing surface may rotate relative to the UAV pod. The rotatable UAV landing surface may be rotated relative to the UAV pod to a predetermined alignment in the open position. The system may also include two or more regions disposed on an interior surface of the UAV pod so that the rotatable UAV landing surface may rotate one or more contact points of a UAV resting on the rotatable landing surface to align the one or more contact points of the UAV with at least one of the two or more regions for data transmission between the UAV and the UAV pod. In embodiments, the rotatable UAV landing surface may translate to elevate the UAV above the two or more regions, rotate the UAV landing surface to align the one or more contact points with the at least one of the two or more regions, and translate to lower the UAV to make contact between the one or more contact points of the UAV and the at least one of the two or more regions. The rotatable UAV landing surface may also include one or more guides for aligning a wing of a UAV, and the one or more guides may include a rigid alignment tab that extends upward from the telescoping UAV landing surface. Alternatively, the one or more guides may include opposing guides that taper together towards their bases to form a generally scalloped surface, and the generally scalloped surface of the opposing guides may rotatably guide the wing of the UAV into a predetermined angular orientation relative to the telescoping UAV landing surface as the wing slides along the scalloped surface. The one or more guides may be at least one of: rails, posts, and paddles. In other embodiments, the one or more guides may include guide paddles, wherein each pair of guide paddles forms a V-channel that guide the wing of the UAV into a proper angular orientation relative to the UAV pod. The one or more guides may also include guide posts, wherein the guide posts are spaced apart to allow the wing of the UAV to be seated between the guide posts. The rotatable UAV landing surface may be rotated relative to the UAV pod to account for crosswind during a launch of a UAV seated in the UAV landing surface. In other embodiments, the rotatable UAV landing surface may be rotated relative to the UAV pod to align a wing of a UAV seated in the UAV landing surface subsequent to a landing of the UAV.

BRIEF DESCRIPTION OF THE DRAWINGS

The components in the figures are not necessarily to scale, emphasis instead being placed upon illustrating the principals of the invention. Like reference numerals designate corresponding parts throughout the different views. Embodiments are illustrated by way of example and not limitation in the figures of the accompanying drawings, in which.

DETAILED DESCRIPTION

A vertical takeoff and landing (VTOL) unmanned aerial vehicle (UAV) system is disclosed that provides for improved remote geographic survey capabilities. Multiple autonomous mission launches and landings may be accomplished using a two-rotor VTOL UAV that is capable of efficient horizontal flight, and a UAV pod having a UAV pod processor, with the UAV selectively enclosed in the UAV pod for protection against the external environment when not in use, recharging and/or transferring data.

A UAV pod launch and landing system is disclosed that may have a telescoping UAV landing surface disposed in the interior of the UAV pod. The UAV landing surface may be translated up toward a top opening of the UAV pod for launching a UAV, and the surface may have one or more guides to orient the wings of the UAV relative to the UAV pod. The UAV landing surface may be rotated prior to launching the UAV to account for crosswinds, and may also be rotated to properly align the UAV wings relative to the UAV pod upon landing of the UAV to enable seating of the UAV into an interior of the UAV pod. Once the UAV has landed and is properly oriented, the UAV landing surface may translate down into the interior of the UAV pod.

Exemplary UAV pod and UAV Structure

Figure 1:
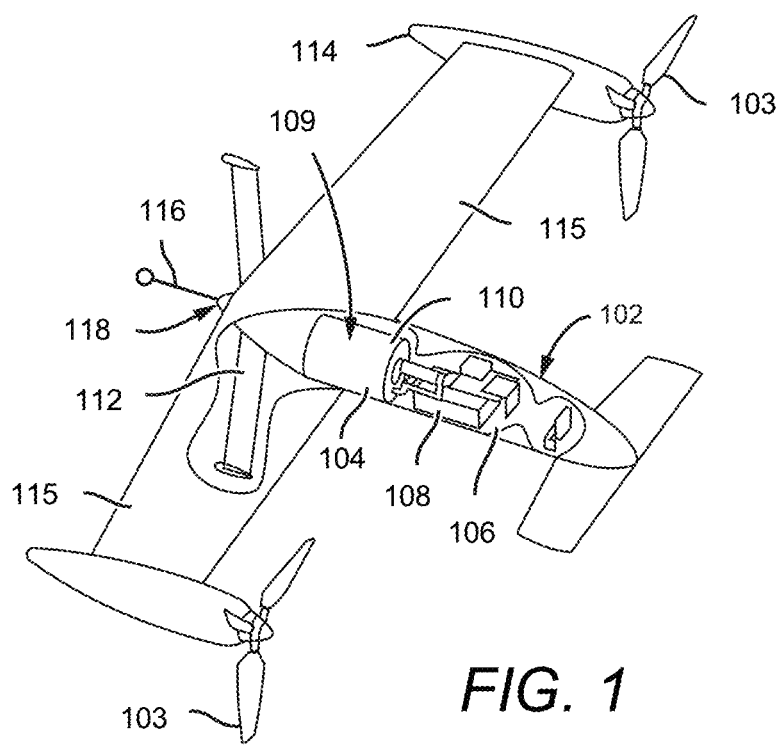
FIG. 1 is a perspective view of the two-rotor UAV.

FIG. 1 is a perspective view of the two-rotor UAV 102. The UAV 102 has only two rotors 103, enabling vertical takeoff and landing (VTOL) missions out of the UAV pod. The UAV 102 has a UAV transceiver 104 within a UAV fuselage 106. A UAV processor 108 is also seated in the UAV 102 and in communication with the UAV transceiver 104. The UAV 102 also includes a battery 109 for providing power to the rotor motors and the electronics, including the processor 108. The UAV processor 108 is configured to receive a plurality of flight mission information that may include waypoints, altitude, flight speed, sensor suite configuration data, launch day/time and mission weather sensor go and no-go parameters. The UAV 102 may have a variety of electrical optical (EO) sensors 110, such as LiDAR, RADAR, infrared, visible-spectrum cameras, or other active or passive sensors that may be used to detect soil moisture, crop density, crop health, terrain, or other objects or qualities of interest. The UAV 102 may have a rear landing gear 112 extending off of a rear of the fuselage 106 that may be used in combination with UAV engine nacelles 114 to enable a four-point landing for more stable landings on the UAV pod. The landing gear 112 may also function as a flight surface or aerodynamic surface, such as a vertical stabilizer, providing corrective (passive) forces to stabilize the UAV 102 in flight, such as to stabilize in a yaw direction. The UAV 102 may have wings 115 to provide the primary source of lift during the UAV cruise (e.g., horizontal flight), while the two rotors 103 provide the primary source of lift during the VTOL phases of UAV flight. This combination of wing and rotor use allows for efficient flight while collecting flight survey data, which increases the range and/or duration of a particular flight while also allowing the UAV 102 to land and take off from the relatively small UAV pod landing area. In one embodiment, the UAV 102 may take off and land vertically using the two rotors 103 that themselves are operable to lift the UAV 102 vertically upwards, transition the UAV 102 to horizontal flight to conduct its survey or other flight mission, and then transition it back to vertical flight to land the UAV 102 vertically downwards, with attitudinal control for the UAV 102 in all modes of flight (vertical and horizontal) coming entirely from the rotors 103 (as driven by a means of propulsion) without the benefit or need of aerodynamic control surfaces, such as ailerons, an elevator, or a rudder. One such UAV 102 is described in international patent application number PCT/US14/36863 filed May 5, 2014, entitled "Vertical Takeoff and Landing (VTOL) Air Vehicle" and is incorporated by reference in its entirety herein for all purposes. Such a UAV 102 benefits from a more robust structure by reducing the opportunity for damage to control surfaces (i.e., there aren't any), and may be made lighter and with less complexity.

The UAV 102 may also be provided with a rearward facing tang 116 extending off of a rear portion 118 of the fuselage 106 in lieu of or in addition to rear landing gear 112. Such rearward-facing tang 116 may be metallic or have metallic contacts for receipt of electrical signals (i.e., data) and/or power for charging the UAV's battery 109.

Figure 2:
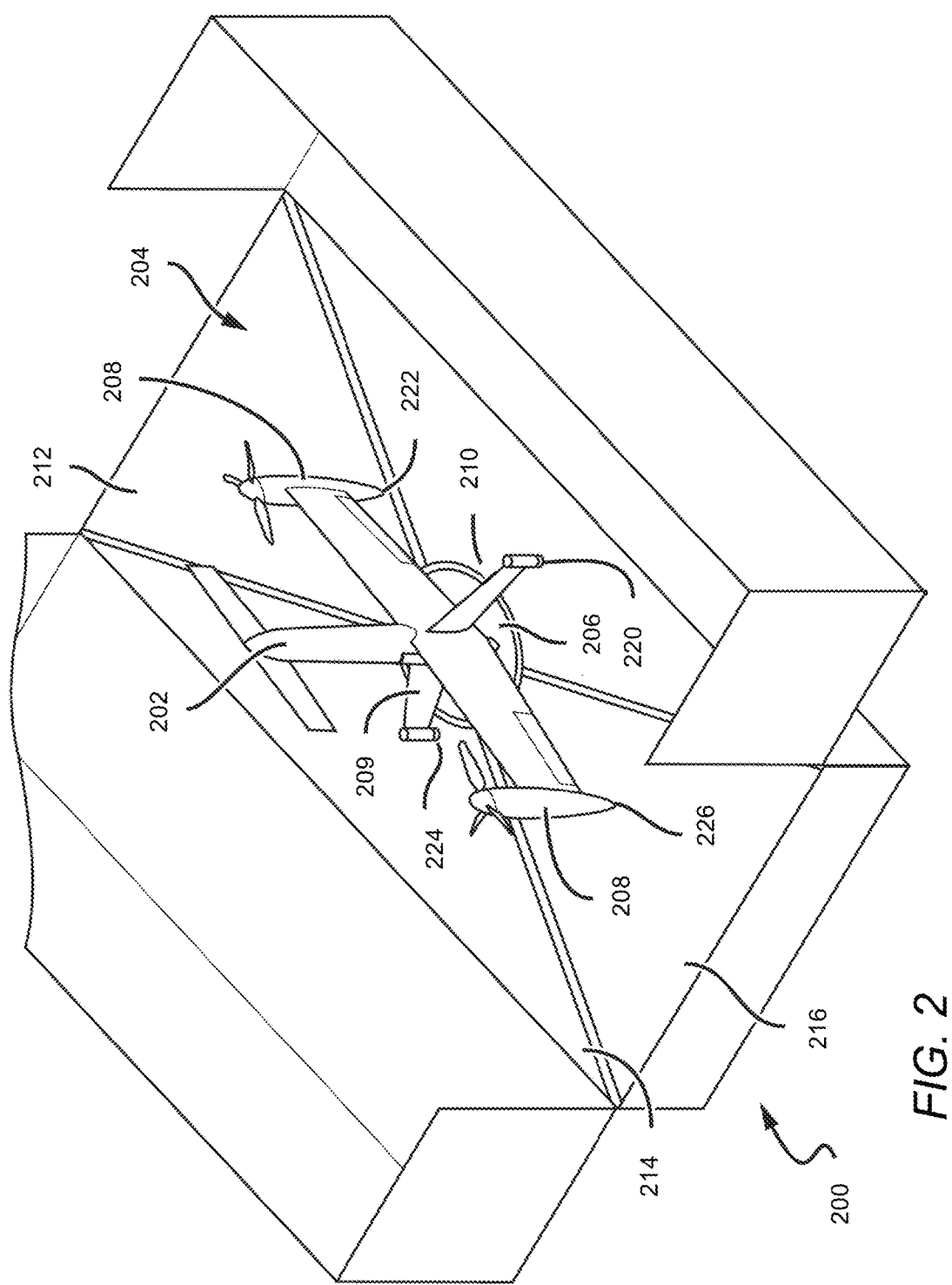
FIG. 2 shows an embodiment with a UAV pod with a UAV resting on a surface.

FIG. 2 shows an embodiment with a UAV pod 200 with a UAV 202 resting on a surface 204. The surface 204 is divided into regions 210, 212, 214 and 216, where each region has an electrically conductive surface that can provide either power and/or a communication connection at each of the UAV's 202 points of contact on the surface 204, respectfully points 220, 222, 224 and 226. The UAV's contact points are each electrically conductive and wired within the UAV 202 back to either a battery and/or a data connection within the air vehicle. For example, in embodiments, the points 222 and 226 are positioned on the end of each motor pod 208 and are connected to the UAV's battery with one point being a positive lead and the other a negative lead for direct current charging. Likewise, the vertical stabilizers 209 each have a contact point, 220 and 224, for data transmission. The UAV pod 200 can include a turntable 206 that can be utilized to rotate the UAV 202 to an orientation that allows proper electrical contact to be made between the regions 210, 212, 214, and 216, and the contact points 220, 222, 224, and 226. In embodiments the turntable can rise up to elevate the UAV 202 above the surface 204 until proper alignment between the regions 210, 212, 214, and 216 and the contact points 220, 222, 224, and 226 is made and then lowered to make contact there between.

Alternative UAV Pod Covers and Landing Mechanisms

Figure 3:
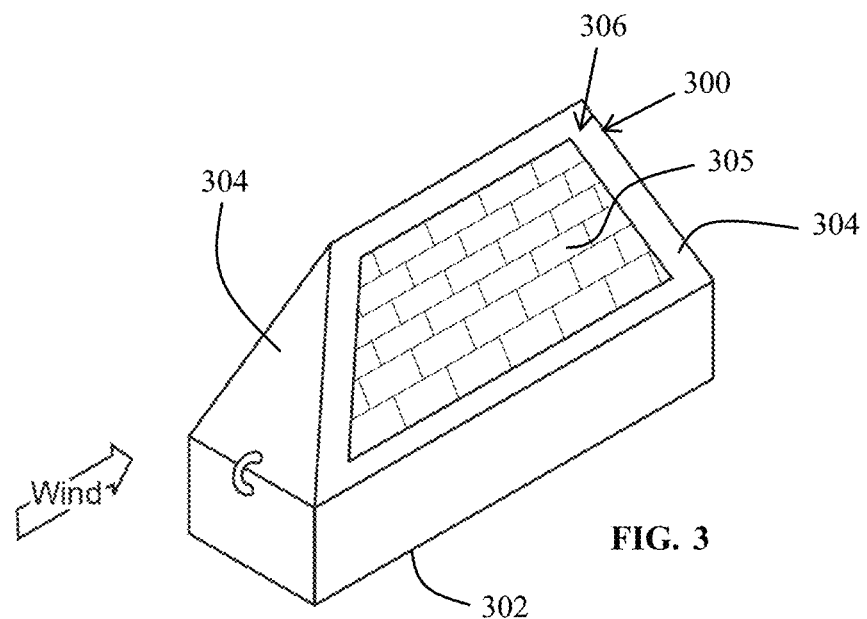
FIGS. 3 and 4 are side perspective and cross sectional views, respectively, of another embodiment of a UAV pod having a low profile when closed, with lateral faces angled for low wind resistance and favorable positioning of solar cells.
Figure 4:
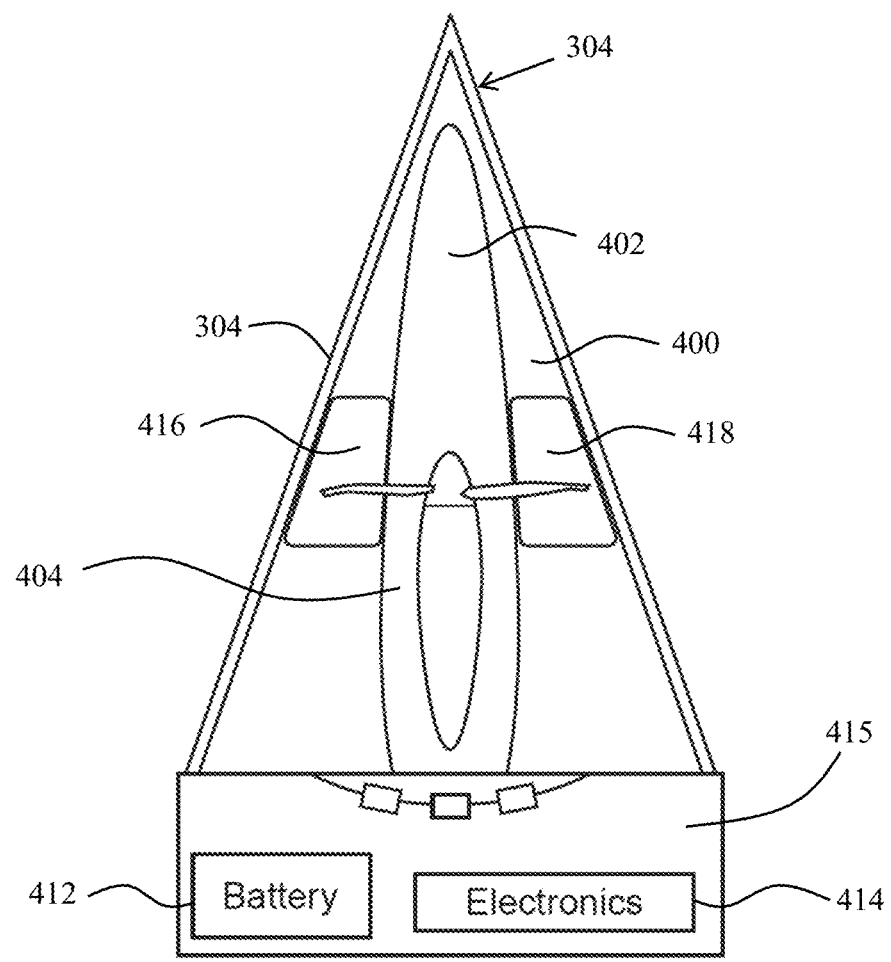

FIGS. 3 and 4 are side perspective and cross sectional views, respectively, of another embodiment of a UAV pod having a low profile when closed, with lateral faces angled for low wind resistance and favorable positioning of solar cells. The UAV pod 300 may have a quadrilateral base 302, preferably rectangular, and polygonal lateral faces 304 that taper to a top of the UAV pod 300. The solar cells 305 may be positioned on one or more of the polygonal lateral faces 304. The polygonal lateral faces 304 may form a UAV pod cover 306 that may selectively enclose a two-rotor UAV in an interior 400 of the UAV pod 300. The UAV pod cover 306 may be waterproof, but not sealed, for environmental protection for the UAV against the external environment. A battery 412 and UAV pod electronics 414 may be enclosed within an interior compartment 415 for further protection from the external environment. Cover UAV-support pads (416, 418) extend from opposing lateral faces 304 of the UAV pod cover 306 into the interior 400 of the UAV pod 300 to abut and hold into position the UAV 402 when in the closed position (see FIG. 4). This holding of the UAV 402 in place by the cover UAV-support pads 416 and 418 facilitate transportation of the UAV and pod system to and from locations by preventing or reducing possible damage to the UAV during transit.

Figure 5:
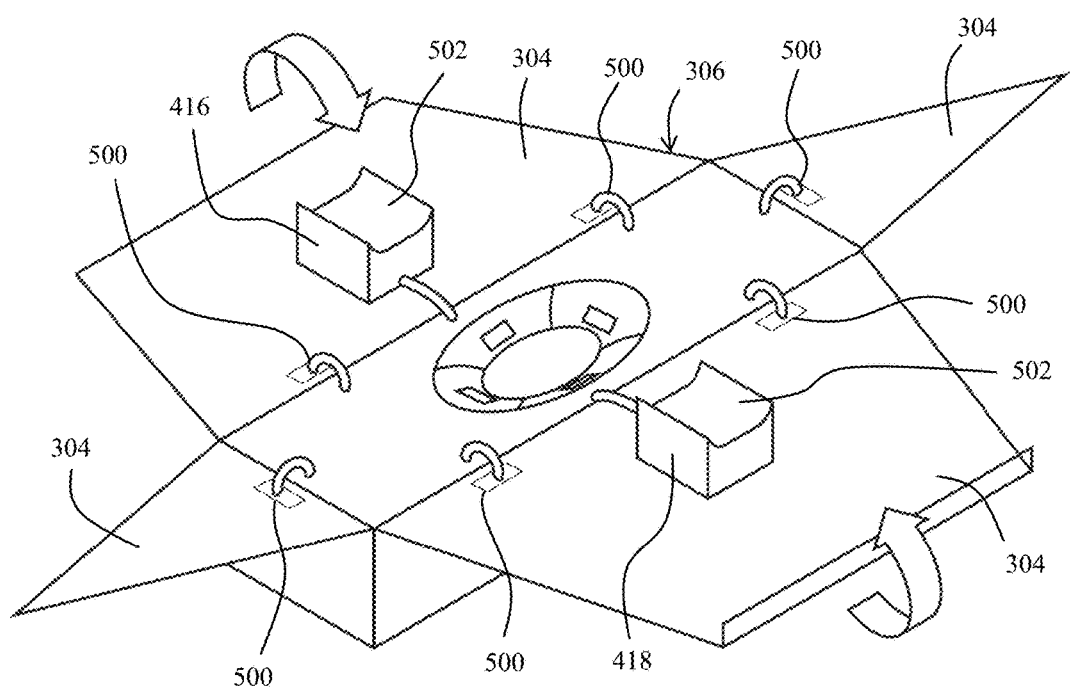
FIG. 5 depicts an open position of the UAV pod cover first illustrated in FIGS. 3 and 4.
Figure 6:
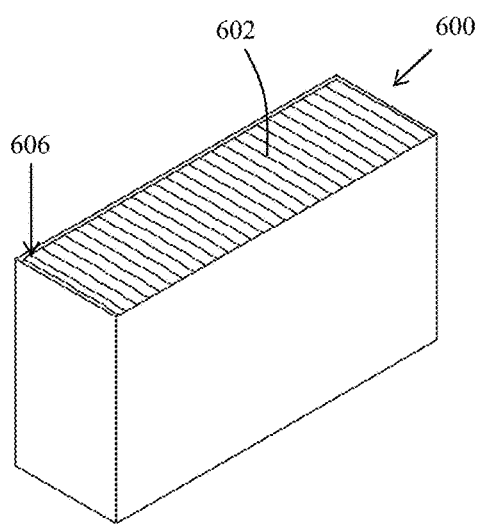
FIGS. 6, 7, 8 and 9 illustrate perspective views of closed, ready-for-landing, landed, and ready-for-closing configurations, respectively, of another embodiment of a UAV pod that allows for advantageous orientation for take-off and landing of a UAV in wind.
Figure 7:
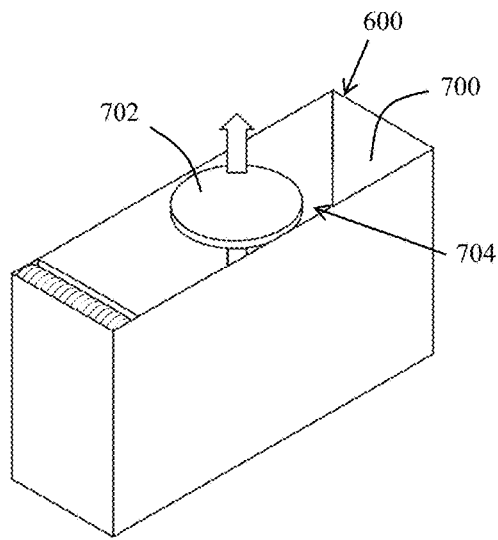
Figure 8:
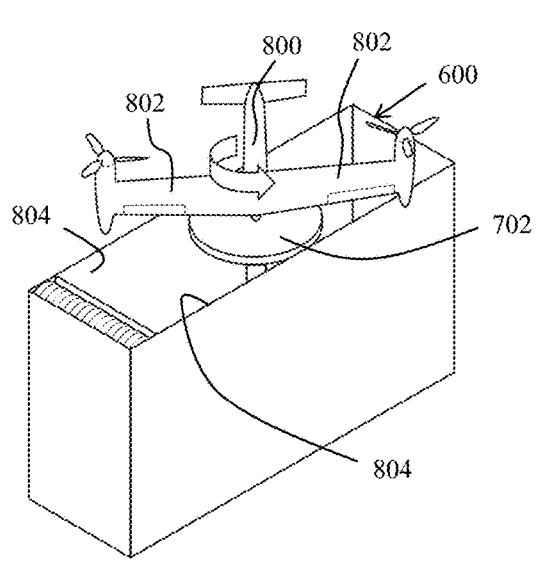
Figure 9:
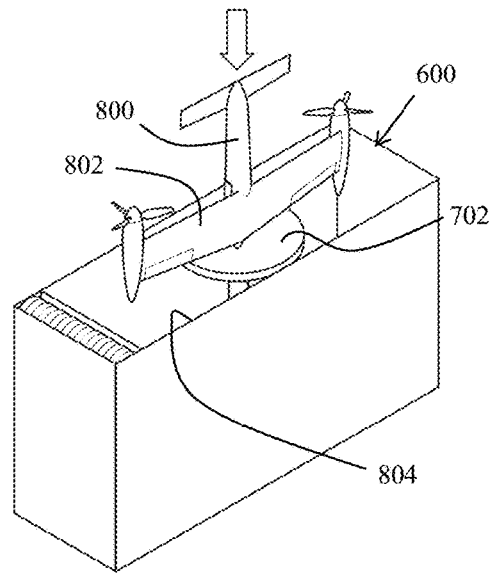

FIG. 5 depicts an open position of the UAV pod cover 306 first illustrated in FIGS. 3 and 4. In the illustrated embodiment, each of the four lateral faces 304 have respective hinges 500 that enable the faces 304 to rotate outwardly away from the interior 400 of the UAV pod 300 to expose the UAV 402 for unobstructed launch. The cover pads (416, 418) may have UAV-facing surfaces 502 that have a complementary shape to that of an exterior surface 404 (see FIG. 4) of the UAV to better secure the UAV from lateral movement within the interior. The cover pads (416, 418) may also incorporate UAV charging and cooling functions so that as the cover 306 is closed to abut the UAV 402, the UAV pads (416, 418) contact complementary contacts on the UAV (not shown) to close an electrical circuit for charging of the UAV's internal batteries, or to enable inductive charging (i.e., wireless charging) of the UAV's batteries. Such contacts may also enable closed-circuit communication between the UAV 402 and the UAV pod 300 (including the electronics 414).

FIGS. 6, 7, 8 and 9 illustrate perspective views of closed, ready-for-landing, landed, and ready-for-closing configurations, respectively, of another embodiment of a UAV pod 600 that allows for advantageous orientation for take-off and landing of a UAV in wind. An articulated roller cover 602 is operable to translate laterally across a top opening 704 of the UAV pod 600 to be taken up at a proximal end 606 of the UAV pod 600 (such as by rolling) to expose an interior volume 700 of the UAV pod 600. A telescoping landing surface 702 may translate up toward the top opening 704 of the interior volume 700 for receipt (or launch) of a UAV 800. Subsequent to the UAV 800 landing on the landing surface 702, the landing surface 702 may be rotated (indicated by arrows) to better position the UAV 800 for receipt into the interior volume 700. For example, the UAV 800 and associated wings 802 may be rotated with the landing surface 702 so that the wings 802 do not impinge on side walls 804 of the UAV pod 600 (see FIG. 9) as the UAV 600 and landing surface 702 are translated down into the interior volume 700 for protective storage. Similarly, in preparation for takeoff, the UAV 800 may be oriented to account for crosswind during launch.

Figure 10:
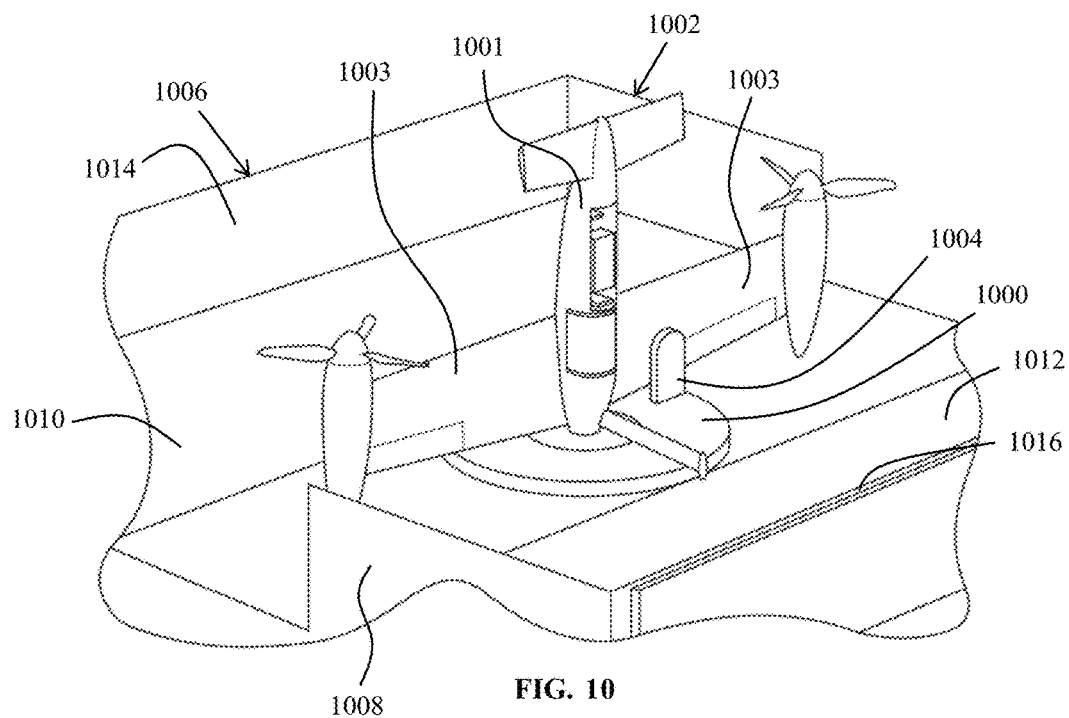
FIGS. 10 and 11 illustrate another embodiment of a UAV pod landing surface and cover that may be used for advantageous UAV storage and takeoff alignments.
Figure 11:
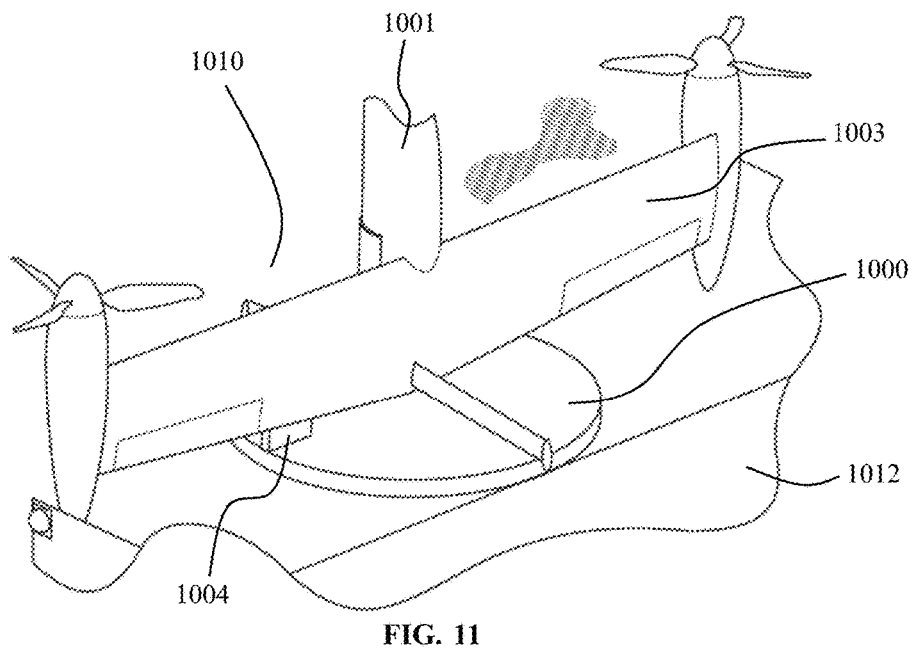

FIGS. 10 and 11 illustrate another embodiment of a UAV pod landing surface and cover that may be used for advantageous UAV storage and takeoff alignments. The landing surface 1000 may be operable to rotate the UAV 1001 within the UAV pod 1002 for predetermined UAV alignment. A rigid alignment tab 1004 may extend up from the landing surface 1000 to guide the UAV 1001, if required, as the landing surface 1000 rotates. The UAV pod 1002 may be provided with opposing hinged covers (1006, 1008) that, when fully opened, extend the otherwise available interior volume of the UAV pod 1002 to enable the UAV 1001 to rotate within the UAV pod 1002 without the UAV's wings 1003 impinging on sidewalls of the UAV pod 1002. In the illustrated example, the hinged covers (1006, 1008) have lateral walls (1010, 1012) and top walls (1014, 1016) that establish the exterior lateral faces and top surfaces, respectively, of the UAV pod 1002 when the hinged covers are closed. When opened (the illustrated configuration), the lateral walls (1010, 1012) are generally coplanar with the landing surface 1000 thus extending clearance for the wings 1003 of the UAV 1001 to rotate within the UAV pod 1002. This rotating feature may allow the UAV 1001 to be orientated correctly with respect to the prevailing wind for launch. Upon the UAV's return and landing, the UAV 1001 may be rotated back into an orientation that allows the hinged covers (1006, 1008) to close.

Figure 12:
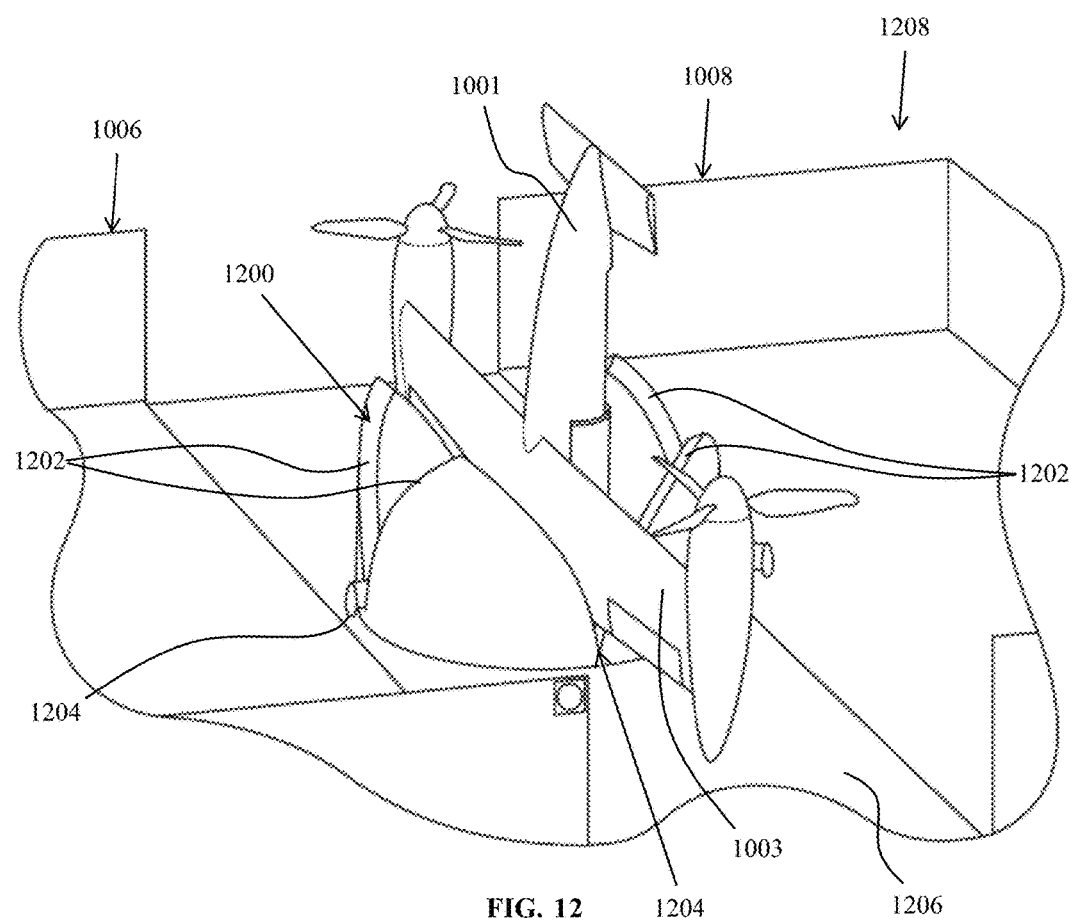
FIG. 12 is a perspective view of another embodiment of a landing mechanism in a UAV pod for capture and launch of a UAV.

FIG. 12 is a perspective view of another embodiment of a landing mechanism in a UAV pod for capture and launch of a UAV. A landing guide 1200 may be provided having two or more sets of opposing guides, preferably guide walls 1202, that taper together towards their bases 1204 to form a generally scalloped guiding surface to rotatably guide a wing 1003 of a UAV 1001 into a predetermined angular orientation with respect to a landing surface 1206 of a UAV pod 1208 as the UAV descends towards the landing surface 1206. In the illustrated embodiment, the landing guide 1200 is operable to rotate a seated UAV 1001 into an orientation that would allow the hinged covers (1006, 1008) to close to selectively encompass the UAV for protection from the external environment. In alternative embodiments, the opposing guides may be guide rails, posts or other rigid or semi-rigid structures that may receive the UAV wings 1003 as the UAV 1001 descends into the UAV pod.

Figure 13:
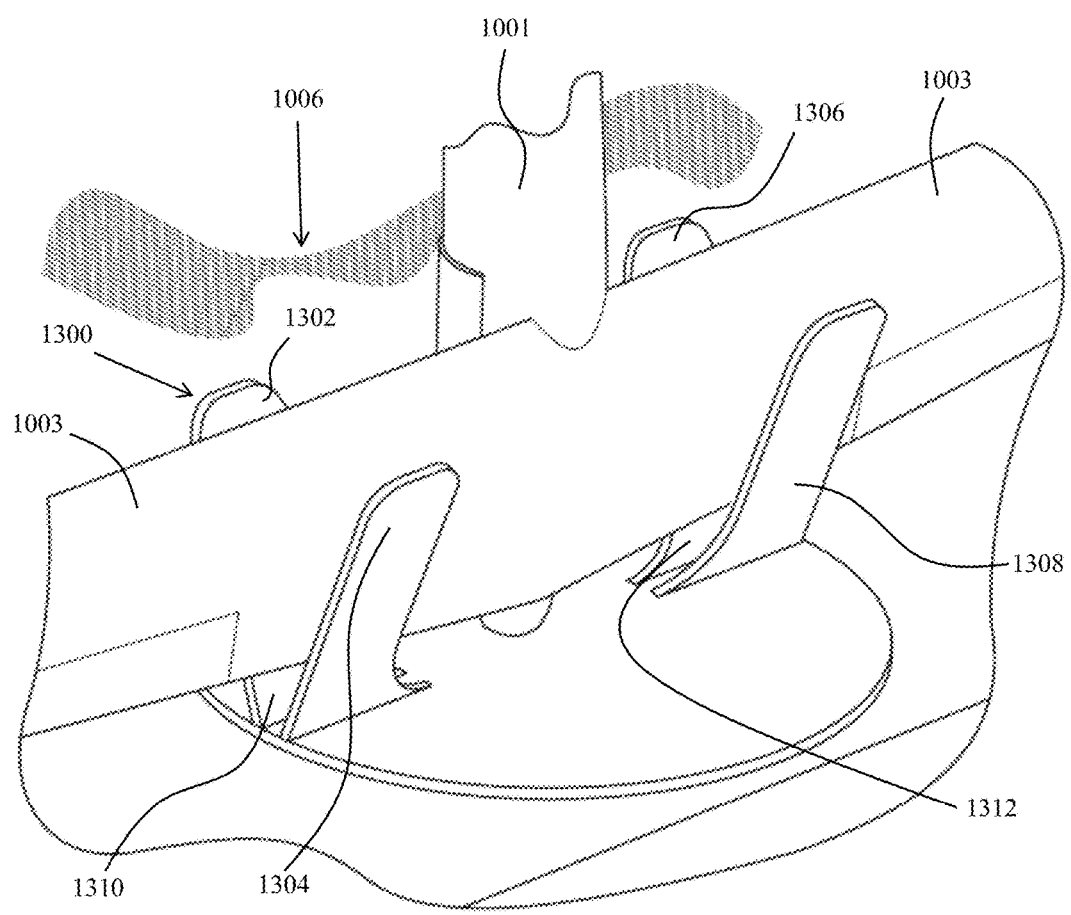
FIG. 13 is a perspective view of another embodiment of a landing mechanism in a UAV pod for capture and launch of a UAV.

FIG. 13 is a perspective view of another embodiment of a landing mechanism in a UAV pod for capture and launch of a UAV. The landing mechanism 1300 may have two pairs of opposing guides, preferably guide paddles (1302, 1304, 1306, 1308). Each pair of guide paddles (1302, 1304) (1306, 1308) form a V-channel (1310, 1312) that serve to guide the wings 1003 of the UAV 1001 into a proper angular orientation with respect to the UAV hinged cover 1006 to allow the hinged covers (1006, 1008, see FIG. 12) to close to selectively encompass the UAV for protection from the external environment. In an alternative embodiment, the landing mechanism 1300 is operable to rotate.

Figure 14:
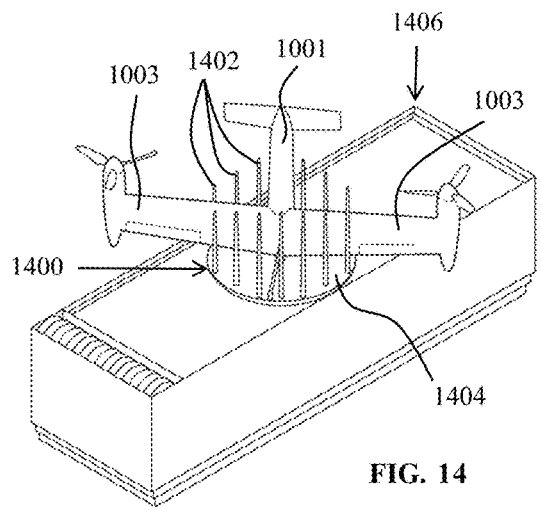
FIGS. 14, 15, and 16 are perspective views of a UAV pod, landing mechanism, and operative steps made to receive and protect a UAV.
Figure 15:
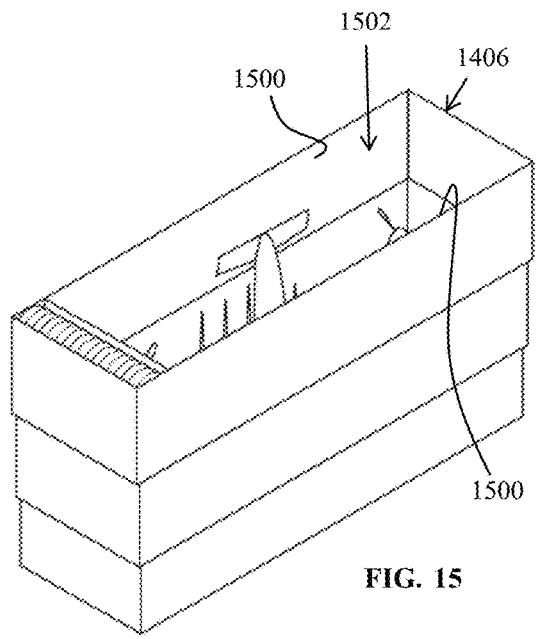
Figure 16:
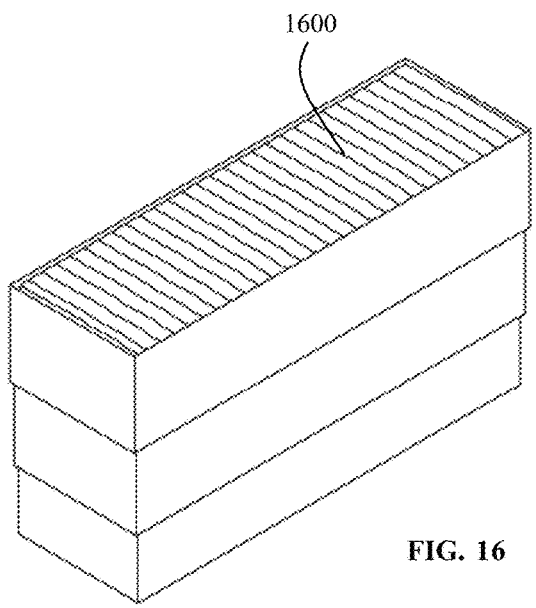

FIGS. 14, 15, and 16 are perspective views of a UAV pod, landing mechanism, and operative steps made to receive and protect a UAV. FIG. 14 illustrates the UAV 1001 seated in a landing mechanism 1400 that includes a plurality of posts 1402 that extend upwardly from a landing surface 1404. The posts 1402 are spaced apart sufficiently to enable seating there between of wings 1003 of the UAV 1001. The landing mechanism 1400 of the UAV pod 1406 may be operable to rotate about a central pivot point to reorient the UAV 1001 such that the wings 1003 of the UAV 1001 do not impinge on sidewalls 1500 of the UAV pod 1406 as the landing surface 1404 translates vertically down into an interior volume 1502 of the UAV pod 1406 with the UAV 1001 seated on it. An articulated or otherwise flexible UAV pod cover 1600 may then be unspooled, drawn or driven across a top opening of the interior volume 1502 to selectively enclose the UAV 1001 within the UAV pod 1406 for protection against the external environment.

Figure 17:
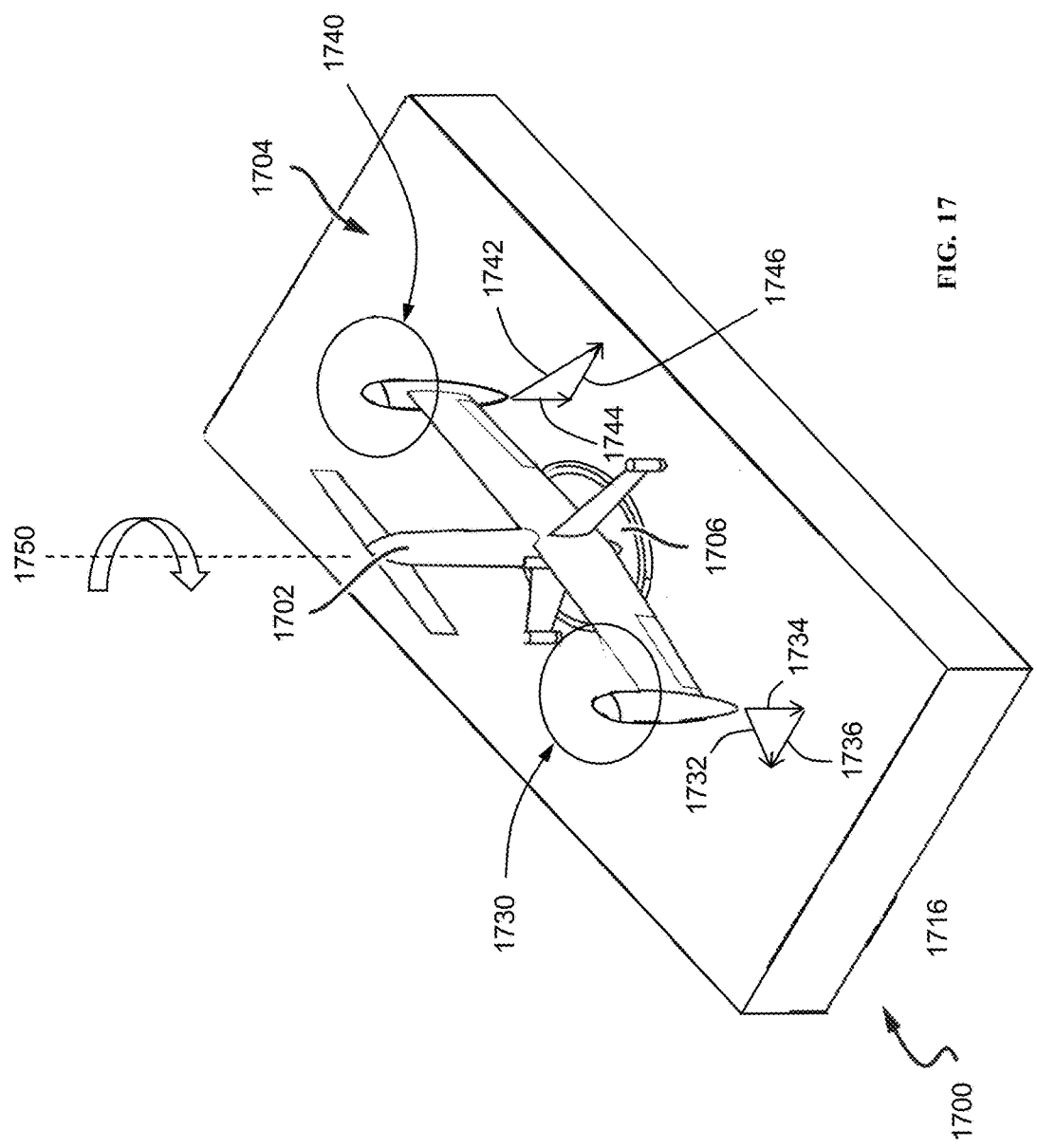
FIG. 17 is a perspective view of another embodiment of a UAV pod with a UAV resting on a turntable above a surface.

FIG. 17 shows an embodiment of a UAV pod 1700, with a UAV 1702 resting on a turntable 1706 and above a POD surface 1704. The turntable 1706 is capable of translating up and down within the UAV pod 1700 to raise and lower the UAV 1702 such that the UAV 1702 is either not in contact with the surface (i.e., above) or is resting on the surface 1704. When the turntable 1706 is raised up, the UAV 1702 may seated on and rotate with the turntable 1706 relative to the POD surface 1704 to allow for positioning of the UAV 1702 in relation to the prevailing wind for takeoffs and landings, and/or relative to the pod 1700 for charging, data transmission and/or closing of the pod doors (not shown). The turntable 1706 may be powered or unpowered. In embodiments, the UAV 1702 may use thrust generated by its rotors 1730 and 1740 to rotate the UAV 1702 and the unpowered turntable 1706 (while the UAV 1702 is resting on, or in contact with, the turntable 1706). The thrust generated by the rotors 1730 and 1740 is directed in a manner to create components in opposite directions that result in a moment being applied on the UAV 1702 about a vertical axis. For example, as shown, the rotors 1730 and 1740 are pitched to a negative angle of attack, via a collective control input, such that a reverse thrust is generated. Then an asymmetric force in a direction to cause rotation of the UAV 1702 is generated, via a cyclic control input. This rotation force is generated in the same manner as is done to roll the UAV 1702 in horizontal flight or yaw the UAV 1702 in vertical flight. No other control forces, such as those generated by positioning of a control surface, is necessary. As shown in FIG. 17, the downward thrust 1732 of the rotor 1730 is directed at an angle, such to generate a downward component 1734 and a sideways component 1736. Likewise, the downward thrust 1742 of the rotor 1740 is directed at an angle, to create a downward component 1744 and a sideways component 1746. The sideways component 1746 is applied in the opposite direction of the component 1736, causing a rotational moment to be imparted on the UAV 1702 causing it to turn in direction 1750. Using reverse thrust provides that the vertical components 1734 and 1744 of the thrust force causes the UAV 1702 to be held down on the turntable 1706. In embodiments, forward thrust can also be used, but it lacks the downward components to hold the UAV 1702 in place. In some embodiments, the rotation force can be achieved by generating force from just a single rotor.

While various embodiments of the invention have been described, it will be apparent to those of ordinary skill in the art that many more embodiments and implementations are possible that are within the scope of this invention.

What is claimed is:

1. A method comprising:
    translating a rotatable UAV landing surface up above one or more data regions disposed on a surface proximate the rotatable UAV landing surface, wherein each of the one or more data regions has an electrically conductive surface, and wherein a UAV is resting on the rotatable UAV landing surface, the UAV comprising one or more electrically conductive data contact points;
    rotating the rotatable UAV landing surface to align the one or more electrically conductive data contact points of the UAV with the at least one of the one or more data regions; and
    translating the rotatable UAV landing surface to lower the UAV to make contact between the one or more electrically conductive data contact points of the UAV and the at least one of the one or more data regions.

2. The method of claim 1 further comprising:
    launching the UAV from the rotatable UAV landing surface.

3. The method of claim 1 wherein translating the rotatable UAV landing surface to lower the UAV further comprises:
    contacting one or more electrically conductive power contact points of the UAV with one or more power regions, wherein the one or more power regions are disposed on the surface proximate the rotatable UAV landing surface, and wherein each of the one or more power regions has an electrically conductive surface.

4. The method of claim 3 further comprising:
    translating the rotatable UAV landing surface up above one or more power regions disposed on the surface proximate the rotatable UAV landing surface, wherein each of the one or more power regions has an electrically conductive surface, and wherein the UAV comprises one or more electrically conductive data contact points;
    rotating the rotatable UAV landing surface to align the one or more electrically conductive power contact points of the UAV with the at least one of the one or more power regions; and
    translating the rotatable UAV landing surface to lower the UAV to make contact between the one or more electrically conductive power contact points of the UAV and the at least one of the one or more power regions.

5. The method of claim 2 further comprising:
    rotating, prior to launching the UAV, the rotatable UAV landing surface to account for crosswind.

6. The method of claim 5 wherein rotating the rotatable UAV landing surface further comprises:
generating, by at least one motor of the UAV, a reverse thrust to create an asymmetric force to rotate the rotatable UAV landing surface.

7. The method of claim 1 further comprising:
landing the UAV on the landing surface.

8. The method of claim 7 further comprising:
rotating, prior to translating the rotatable UAV landing surface, the rotatable UAV landing surface.

9. The method of claim 8 wherein rotating the rotatable UAV landing surface further comprises:
generating, by at least one motor of the UAV, a reverse thrust to create an asymmetric force to rotate the rotatable UAV landing surface.

10. An unmanned aerial vehicle (UAV) storage and launch system, comprising:
a rotatable UAV landing surface; and
one or more data regions disposed on a surface proximate the rotatable UAV landing surface, wherein each of the one or more data regions has an electrically conductive surface;
wherein the rotatable UAV landing surface is configured to rotate relative to the one or more data regions;
wherein the rotatable UAV landing surface is configured to rotate a UAV resting on the rotatable UAV landing surface relative to the one or more data regions, the UAV comprising one or more electrically conductive data contact points, to align the one or more electrically conductive data contact points of the UAV with at least one of the one or more data regions for data transmission between the UAV and the rotatable UAV landing surface;
wherein the rotatable UAV landing surface is configured to rotate relative to the one or more data regions to a predetermined alignment with respect to a prevailing wind, and wherein the rotatable UAV landing surface is configured to translate to elevate the UAV above the one or more data regions, rotate the rotatable UAV landing surface to align the one or more electrically conductive data contact points with the at least one of the one or more data regions, and translate to lower the UAV to make contact between the one or more electrically conductive data contact points of the UAV and the at least one of the one or more data regions.

11. The system of claim 10 wherein the rotatable UAV landing surface further comprises one or more guides for aligning a wing of the UAV.

12. The system of claim 11 wherein the one or more guides comprises a rigid alignment tab that extends upward from the rotatable UAV landing surface, wherein the rigid alignment tab comprises an elongated surface configured to contact the wing of the UAV.

13. The system of claim 11 wherein the one or more guides comprises opposing guides that taper together towards their bases.

14. The system of claim 13 wherein the opposing guides rotatably guide the wing of the UAV into a predetermined angular orientation relative to the rotatable UAV landing surface.

15. The system of claim 10 further comprising:
one or more power regions disposed on the surface proximate the rotatable UAV landing surface, wherein each of the one or more power regions has an electrically conductive surface;
wherein the rotatable UAV landing surface is configured to rotate the UAV resting on the rotatable UAV landing surface relative to the one or more power regions, the UAV comprising one or more electrically conductive power contact points, to align the one or more electrically conductive power contact points of the UAV with at least one of the one or more power regions for power transmission between the UAV and the rotatable UAV landing surface.

16. The system of claim 11 wherein the one or more guides comprise guide paddles, wherein the guide paddles comprise an elongated surface configured to contact the wing of the UAV, wherein each pair of guide paddles forms a V-channel that guide the wing of the UAV into a proper angular orientation relative to the rotatable UAV landing surface, and wherein the wing of the UAV is at least partially disposed within the V-channel when the UAV is landed.

17. The system of claim 11 wherein the one or more guides comprise guide posts, wherein the guide posts are spaced apart sufficiently to enable seating of the wing of the UAV between the guide posts.

18. The system of claim 10 wherein the one or more electrically conductive data contact points of the UAV are disposed distal from a fuselage of the UAV.

19. The system of claim 10 wherein the rotatable UAV landing surface is configured to rotate relative to the rotatable UAV landing surface to align a wing of the UAV seated in the rotatable UAV landing surface subsequent to a landing of the UAV.

* * * * *